(12) United States Patent
Fiechtner et al.

(10) Patent No.: US 7,344,681 B1
(45) Date of Patent: Mar. 18, 2008

(54) PLANAR MICROMIXER

(75) Inventors: Gregory J. Fiechtner, Bethesda, MD (US); Anup K. Singh, Danville, CA (US); Boyd J. Wiedenman, Alpharetta, GA (US)

(73) Assignee: Sandia Corporation, Livermore, CA (US)

( * ) Notice: Subject to any disclaimer, the term of this patent is extended or adjusted under 35 U.S.C. 154(b) by 377 days.

(21) Appl. No.: 10/960,324

(22) Filed: Oct. 6, 2004

Related U.S. Application Data (63) Continuation-in-part of application No. 10/456,772, filed on Jun. 6, 2003, now Pat. No. 7,005,301.

(51) Int. Cl.
G01N 15/06 (2006.01)
G01N 33/00 (2006.01)
G01N 33/48 (2006.01)
B01L 3/02 (2006.01)
B32B 5/02 (2006.01)

(52) U.S. Cl. .................. 422/100; 422/50; 422/68.1; 422/81; 422/103

(58) Field of Classification Search .............. 422/50, 422/68.1, 81, 100, 103
See application file for complete search history.

(56) References Cited

U.S. PATENT DOCUMENTS

| | | | |
|---|---|---|---|
| 5,842,787 A | 12/1998 | Kopf-Sill et al. | 366/340 |
| 5,904,424 A * | 5/1999 | Schwesinger et al. | 366/336 |
| 5,921,678 A | 7/1999 | Desai et al. | 366/336 |
| 6,033,546 A | 3/2000 | Ramsey | 204/603 |
| 6,136,272 A * | 10/2000 | Weigl et al. | 422/82.05 |
| 6,170,981 B1 | 1/2001 | Regnier et al. | 366/336 |
| 6,270,641 B1 | 8/2001 | Griffiths et al. | 204/451 |
| 6,623,860 B2 * | 9/2003 | Hu et al. | 428/411.1 |
| 6,743,636 B2 | 6/2004 | Chung et al. | 436/100 |
| 7,081,189 B2 * | 7/2006 | Squires et al. | 204/451 |
| 2001/0048900 A1 * | 12/2001 | Bardell et al. | 422/100 |
| 2003/0086333 A1 * | 5/2003 | Tsouris et al. | 366/173.1 |
| 2003/0123322 A1 | 7/2003 | Chung et al. | 366/165.1 |
| 2003/0198130 A1 | 10/2003 | Karp et al. | 366/341 |
| 2003/0207338 A1 | 11/2003 | Sklar et al. | 435/7.21 |
| 2004/0231990 A1 * | 11/2004 | Aubry et al. | 204/547 |

OTHER PUBLICATIONS

Z. H. Fan and D. J. Harrison, "Micromachining of capillary electrophoresis injectors and separators on glass chips and evaluation of flow at capillary intersections," *Analytical Chemistry*, v.66, pp. 177-184, 1994.

S. C. Jacobson, R. Hergenroder, L. B. Koutny, R. J. Warmack, and J. M. Ramsey, "Effects of injection schemes and column geometry on the performance of microchip electrophoresis devices," *Analytical Chemistry*, v.66, pp. 1107-1113, 1994.

(Continued)

*Primary Examiner*—Brian Sines
(74) *Attorney, Agent, or Firm*—Timothy P. Evans (57) ABSTRACT

The present embodiment describes a laminar-mixing embodiment that utilizes simple, three-dimensional injection. Also described is the use of the embodiment in combination with wide and shallow sections of channel to affect rapid mixing in microanalytical systems. The shallow channel sections are constructed using all planar micromachining techniques, including those based on isotropic etching. The planar construction enables design using minimum dispersion concepts that, in turn, enable simultaneous mixing and injection into subsequent chromatography channels.

13 Claims, 6 Drawing Sheets

OTHER PUBLICATIONS

S. C. Jacobson, C. T. Culbertson, J. E. Daler, and J. M. Ramsey, "Microchip structures for submillisecond electrophoresis," *Analytical Chemistry*, v.70, pp. 3476-3480, 1998.

R. H. Liu, M. A. Stremler, K. V. Sharp, M. G. Olsen, J. G. Santiago, R. J. Adrian, H. Aref, and D. J. Beebe, "Passive mixing in a three-dimensional serpentine microchannel," *Journal of Microelectromechanical Systems*, v.9, pp. 190-197, 2000.

D. Stroock, M. Weck, D. T. Chiu, W. T. S. Huck, P. J. A. Kenis, R. F. Ismagilov, and G. M. Whitesides, "Patterning electro-osmotic flow with patterned surface charge," *Physical Review Letters*, v.84, pp. 3314-3317, 2000.

M. H. Oddy, J. G. Santiago, and J. C. Mikkelsen, "Electrokinetic instability micromixing," *Analytical Chemistry*, v.73, pp. 5822-5832, 2001.

S. K. Griffiths and R. H. Nilson, "Low-dispersion turns and junctions for microchannel systems," *Analytical Chemistry*, v.73, pp. 272-278, 2001.

B. He, B. J. Burke, X. Zhang, R. Zhang, F. E. Regnier, "A picoliter-volume mixer for microfluidic analytical systems," *Analytical Chemistry*, v.73, pp. 1942-1947, 2001.

M. Vazquez, G. McKinley, L. Mitnik, S. Desmarais, P. Matusdaira, and D. Ehrlich, "Electrophoresis using ultra-high voltages," *Journal of Chromatography B*, v.779, pp. 163-171, 2002.

J. Kruger, K. Singh, A. O'Neill, C. Jackson, A. Morrison, and P. O'Brien, "Development of a microfluidic device for fluorescence activated cell sorting," *Journal of Micromechanics and Microengineering*, v.12, pp. 486-494, 2002.

A. D. Stroock, S. K. W. Dertinger, A. Ajdari, I. Mezic, H. A. Stone, and G. M. Whitesides, "Chaotic mixer for microchannels," *Science*, v.295, pp. 647-651, 2002.

E. Verpoorte, "Microfluidic chips for clinical and forensic analysis," *Electrophoresis*, v.23, pp. 677-712, 2002.

R. Bharadwaj, J. G. Santiago, and B. Mohammadi, "Design and optimization of on-chip capillary electrophoresis," *Electrophoresis*, v.23, pp. 2729-2744, 2002.

M. Cabodi, Y.-F. Chen, S. W. P. Turner, H. G. Craighead, and R. H. Austin "Continuous separation of biomolecules by the laterally asymmetric diffusion array with out-of-plane sample injection," *Electrophoresis*, v.23, pp. 3496-3503, 2002.

S. Qian and H. H. Bau, "A chaotic electroosmotic stirrer," *Analytical Chemistry*, v.74, pp. 3616-3625, 2002.

V. Mengeaud, J. Josserand, and H. H. Girault, "Mixing processes in a zigzag microchannel: finite element simulations and optical study," *Analytical Chemistry*, v.74, pp. 4279-4286, 2002.

L.-M. Fu, R.-J. Yang, G.-B. Lee, and H.-H. Liu, "Electrokinetic injection techniques in microfluidic chips," *Analytical Chemistry*, v.74, pp. 5084-5091, 2002.

D. Erickson and D. Li, "Microchannel flow with patchwise and periodic surface heterogeneity," *Langmuir*, v.18, pp. 8949-8959, 2002.

R. H. Nilson, S. K. Griffiths, and A. K. Singh, "Injection of Sample Bands from Open Channels into Packed Separation Columns," in *Proceedings of the mTAS 2002 Symposium*, Kluwer Academic Publishers, Boston, MA, v.1, pp. 97-99, 2002.

R. Ashton, C. Padala, and R. S. Kane, "Microfluidic separation of DNA," *Current Opinion in Biotechnology*, v.14, pp. 497-504, 2003.

L.-M. Fu, R.-J. Yang, G.-B. Lee, and Y.-J. Pan, "Multiple injection techniques for microfluidic sample handling," *Electrophoresis*, v.24, pp. 3026-3032, 2003.

G. J. Fiechtner and E. B. Cummings, "Faceted design of channels for low-dispersion electrokinetic flows in microfluidic systems," *Analytical Chemistry*, v.75, pp. 4747-4755, 2003.

L.-M. Fu and C.-H. Lin, "Numerical analysis and experimental estimation of a low-leakage injection technique for capillary electrophoresis," *Analytical Chemistry*, v.75, pp. 5790-5796, 2003.

G. J. Fiechtner and E. B. Cummings, "Low-dispersion electrokinetic flow for expanded separation channels in microfluidic systems: multiple faceted interfaces," *Journal of Chromatography A*, v.1027, pp. 245-257, 2004.

\* cited by examiner

FIG. 6B the PLANAR MICROMIXER

CROSS REFERENCE TO RELATED APPLICATIONS

This application is a Continuation-in-Part of prior U.S. patent application Ser. No. 10/456,772 originally filed Jun. 6, 2003 now U.S. Pat. No. 7,005,301 and entitled "Piecewise Uniform Conduction-Like Flow Channels and Method Therefor" from which benefit is claimed.

STATEMENT OF GOVERNMENT INTEREST

This invention was made with Government support under government contract DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND OF THE INVENTION

Field of the Invention

An embodiment of the present invention relates to a microfluidic apparatus employed for fluid processing. More particularly, the present embodiment relates to a microfluidic mixer employed as a microfluidic reactor apparatus.

Microfluidic devices have become increasingly important for the development of analytical sensors, particularly for the field of biotechnology and chemical assay. In particular, practical devices must function as miniature chemical reactors requiring an ability to rapidly mix constituent materials. However, at the small length scales typical in microanalytical devices, flow takes place at comparatively small Reynolds numbers, precluding the use of turbulence for mixing in a controlled and rational fashion. Under the resulting laminar flow conditions, mixing can take place from diffusion, but this is generally a time-consuming step in microanalytical systems.

This limitation has led to intense interest in micromixing research and development in recent years, (see for instance U.S. Pat. Nos. 5,921,678, 6,033,546, and 6,170,981; U.S. Patent Application Publication Serial Numbers 20030123322, 20030198130 and 20030207338; and Lui, et al., *Journal of Microelectromechanical Systems*, 2000, vol. 9(2) pp. 190-197; and He, et al., *Analytical Chemistry*, 2001, vol. 73(9), pp. 1942-1947). These mixing schemes are designed to induce chaotic advection in the fluids to be mixed, but tend to require complex geometries and/or relatively long channel lengths. In contrast, diffusive mixing can be employed in comparatively narrow sections of channel (see U.S. Pat. No. 5,842,787). Here, the diffusion time is reduced by optimizing the contact surface area-to-volume ratio, reducing the distance over which diffusive mixing must take place. In these schemes, mixing time is controlled by the channel width and length, and the fluid velocity within the channel. These designs require the use of deep, narrow channel sections, which are not readily constructed using common micro-manufacturing techniques such as isotropic etching; moreover, these schemes are not readily used with sample injection methods commonly used in microfluidic devices. What is needed, therefore, is a means for rapidly mixing constituent materials in as compact a geometry as possible that can be constructed using manufacturing techniques and interfacing with microfluidic sample injection methods.

SUMMARY

In the present discussion, we describe a laminar-mixing embodiment that utilizes simple, three-dimensional injection in combination with wide and shallow sections of channel to affect rapid mixing in microanalytical systems. The shallow channel sections are constructed using all planar micromachining techniques, including those based on isotropic etching. The planar construction enables design using minimum dispersion concepts that, in turn, enable simultaneous mixing and injection into subsequent chromatography channels. Moreover, the designs are employed using uniform-field channels, minimizing the uncertainty in mixing rate across the channel width, and minimizing the chances of channel clogging. The height of the mixing channel can be constructed to any desired value based on the fluid diffusivity, enabling rational design optimization for mixing small particles and molecules such as DNA and proteins in bio-analytical microchips.

DETAILED DESCRIPTION OF THE INVENTION

In conventional chromatographic separations using microfluidic instruments, diffusive mixing designs with narrow, deep channels, fluids are injected using conventional techniques in the same plane as the mixing channel. The use of shallow, wide mixing channels requires the use of injection systems located in a different vertical plane with respect to the mixing channels such as is illustrated in the schematics shown in FIGS. 1 and 2.

Figure 1A:
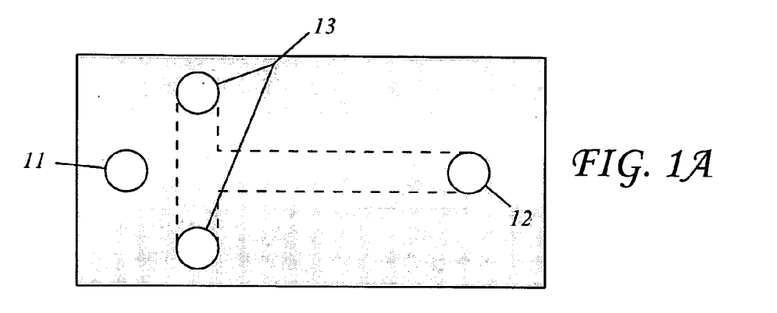
FIGS. 1A, 1B and 1C show respective top, side, and bottom views of an embodiment of the present micro-mixer cover illustrating the fluid inlet and outlet ports and a first mixing channel.
Figure 1B:
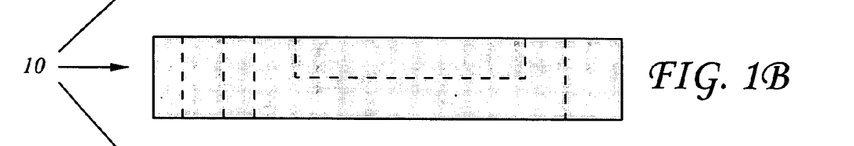
Figure 1C:
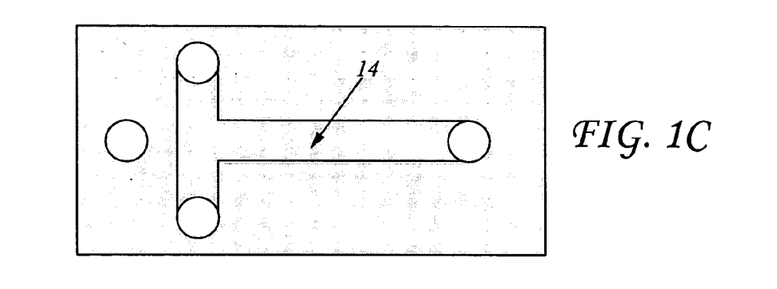
Figure 4A:
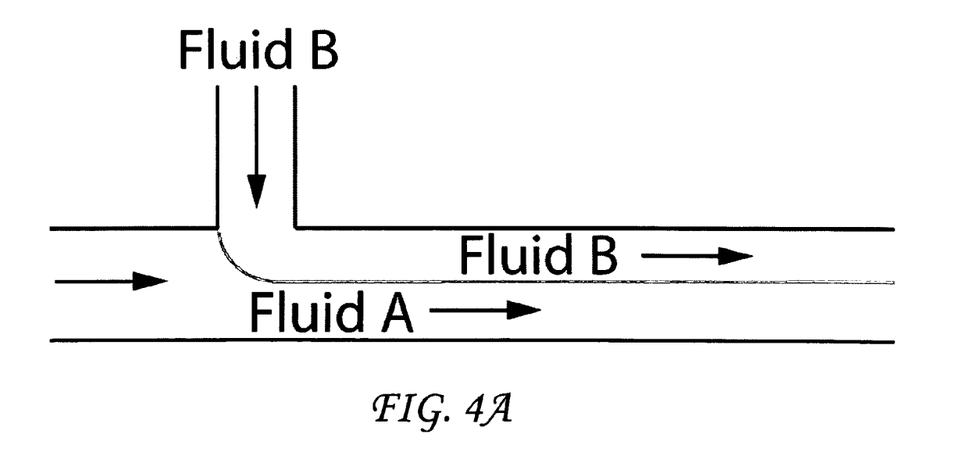
FIG. 4 shows the manner in which two separate fluids flow through the micro-mixer.

In FIGS. 1A-C, the mixer cover 10 is illustrated using a top, a side, and a bottom view. As shown, in FIG. 1C cover 10 includes a "T" shaped channel 14 etched part-way into the thickness of the cover medium; a first inlet port 11 etched or drilled completely through the thickness of the cover medium such that it is in-line with but spaced apart from "T" shaped channel 14; and two off-set second inlet ports 13 etched or drilled through the channel thickness so that each intersects at each end of an arm of the "T" of channel 14. Finally, cover 10 contains a single outlet port 12 etched or drilled through the thickness of channel 14 such that it intersects the far end of the "T" of channel 14. Inlet ports 11 and 13 are used to inject a first and a second fluid, (labeled "Fluid A" and "Fluid B" in FIG. 4, respectively), while single port 2 is used to extract a mixed fluid.

Figure 2A:
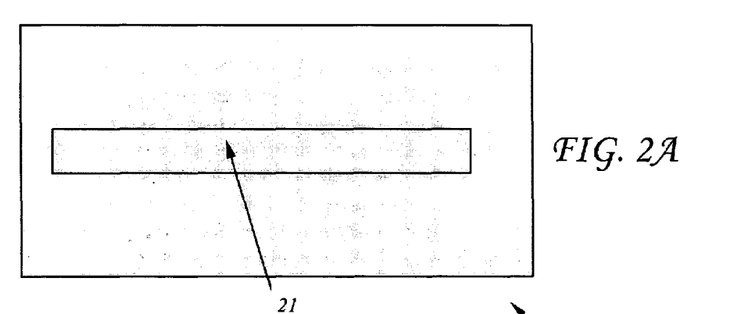
FIGS. 2A and 2B show respective top, and side views of an embodiment of the present micro-mixer base illustrating a second mixing channel designed to lie parallel to the first mixing channel.
Figure 2B:
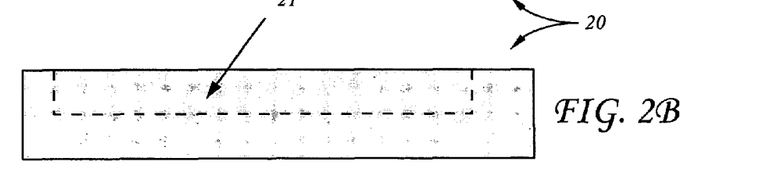

In FIGS. 2A and B, rectangular mixing channel base 20 is illustrated by showing a top and a side view of the part and is characterized by a single channel 21 etched into the thickness of the base medium. The channel dimensions are chosen for the sake of example only and, in fact, could take on nearly any desired width and height, although shallow channels will work particularly well. The length of channel 21 is designed to be long enough to span the distance between first inlet port 11 and outlet port 12 as well as to run parallel to the length of channel 14.

Figure 3A:
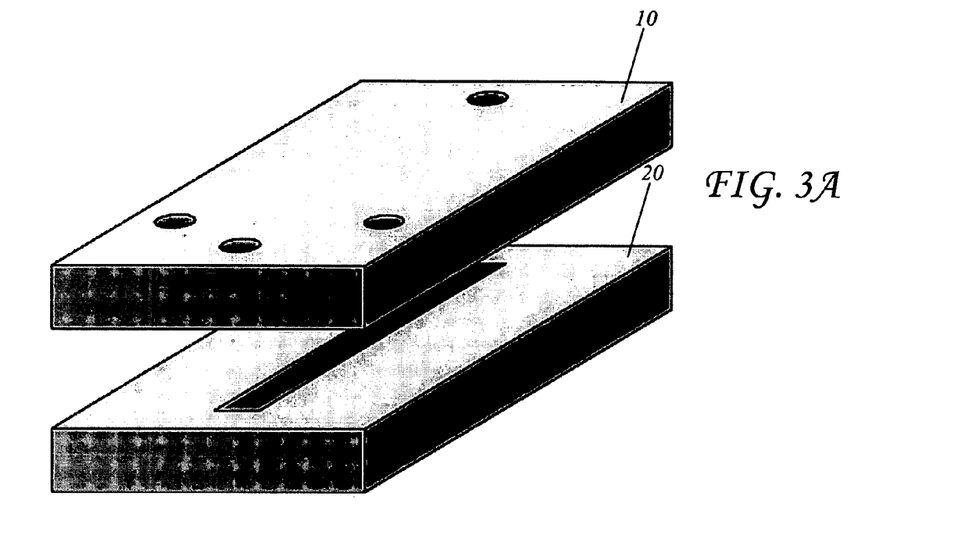
FIGS. 3A and 3B show isometric views of the micro-mixer of the present embodiment as seen from the top and from the bottom.
Figure 3B:
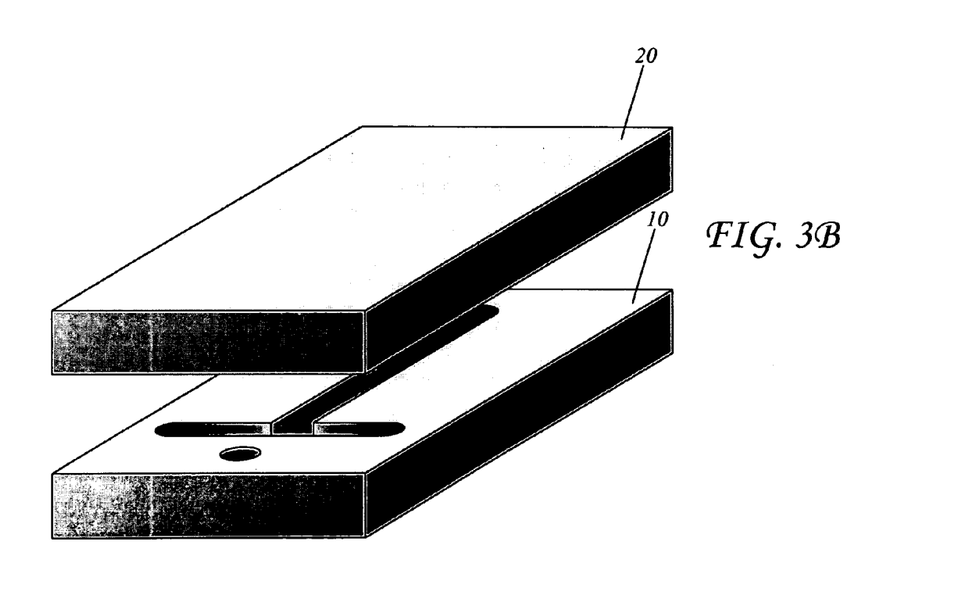
Figure 5A:
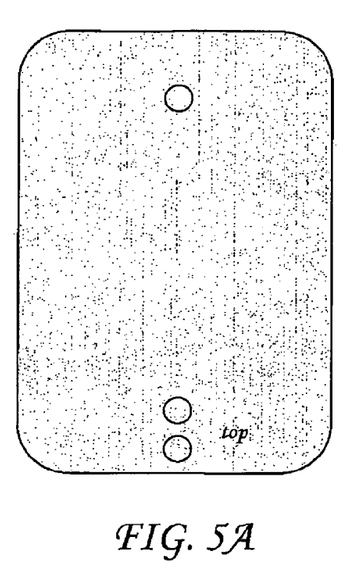
FIGS. 5A and 5B show a cartoon of another embodiment of the present invention.
Figure 5B:
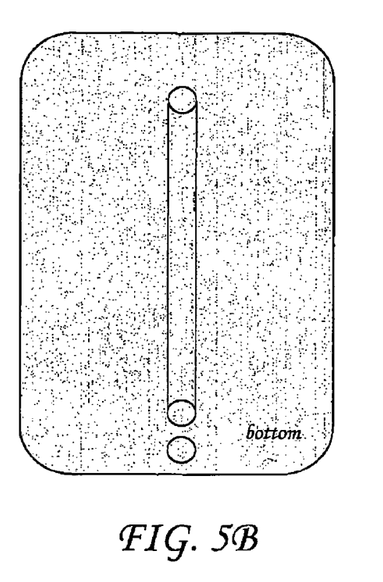

After completing the fabrication of the features of both cover 10 and channel base 20, the two are bonded together as shown in FIGS. 3A and 3B. A similar, alternative embodiment is shown in FIGS. 5A and 5B.

Figure 4B:
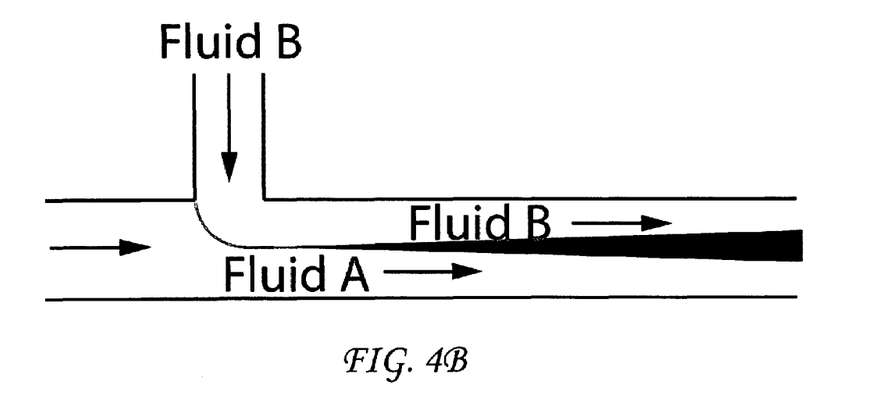

Fluid injection into the present embodiments can be accomplished using any method for driving fluid motion, including electrokinetic pumping, pressure pumping, gravity, magnetic fields, or any other method for moving a fluid. However, the scale of these devices limits flow speeds, which minimizes convective mixing, and the net effect is the laminar flow illustrated in the side view of FIG. 4A. Here Fluids A and B are observed to form distinct layers as the result of this laminar flow following vertical injection. Layers such as these result only if diffusion is negligible, which takes place when the Peclet number (the dimensionless ratio of diffusion time over convection time) is infinitely large. Fortunately, the Peclet number for common microfluidic channels used in practice typically ranges from about 10 to about 100; therefore, diffusion will cause Fluid A to diffuse into Fluid B, and Fluid B to diffuse into Fluid A as is illustrated in FIG. 4B. The degree of diffusive mixing will increase as the flow travels downstream into the channel. For ideal electrokinetic flow, therefore, the degree of mixing will be proportional to the length of the mixing section, the applied field (which results in the desired Peclet number), and the contact surface area between the two layers.

The mixing channels illustrated in FIGS. 1-3, and 5, however, have an aspect ratio near unity such that the width and height of the channel are similar. Since the surface area of the contact layer between Fluids A and B is small, this design is not optimized for diffusive mixing. Increased mixing rates are achieved by increasing the channel aspect ratio. As is well known by those skilled in the art of microanalytical design, injection is accomplished preferably in a channel of modest aspect ratio. Alternatively, the two fluids can be directed through a channel section in which the channel aspect ratio is altered substantially expanding the channel from a modest width to a large width. Unfortunately, haphazard channel expansion has the disadvantage of creating large variations in local fluid speed across the channel resulting in unwanted dispersion and increased probability of channel clogging. A further risk is unwanted recirculation zones that increase the local residence time, effectively increasing the operating time of the microanalytical chip, and complicating chip design, operation, and interpretation of results.

BEST MODE

Fortunately, a method exists for changing channel dimensions while minimizing dispersion. As is described in detail in commonly owned U.S. patent application Ser. No. 10/456,772, now Published Application Serial Number 20030230489, herein incorporated by reference, a flow channel can be constructed as a set of connected rectangular regions each of which has the geometry of a faceted prism. As described previously, these regions can be designed to change the conductance, or permeability, of the channel by changing the channel size, particularly the depth, and the shape in the region of the facet junctions so that fluid flow is piece-wise uniform. By carefully designing the regional geometries to provide low- and high-permeability regions in the channel, dispersion produced by the junctions is essentially eliminated. The terms "deep" and "shallow," as applied in the following paragraphs, are used in a relative sense to describe widely differing channel depths as a means for changing the permeability of the flow channel as illustrated in Published Application Serial Number 20030230489. In general, the ratio of "deep" to "shallow" will mean a minimum ratio of greater than 10:1. A ratio of such a magnitude minimizes deviations from flow uniformity caused by deviations from perfect designs that can be expected due to variability introduced when using isotropic etching methods. If such effects are not important for a given design, smaller ratios may be employed.

Figure 6A:
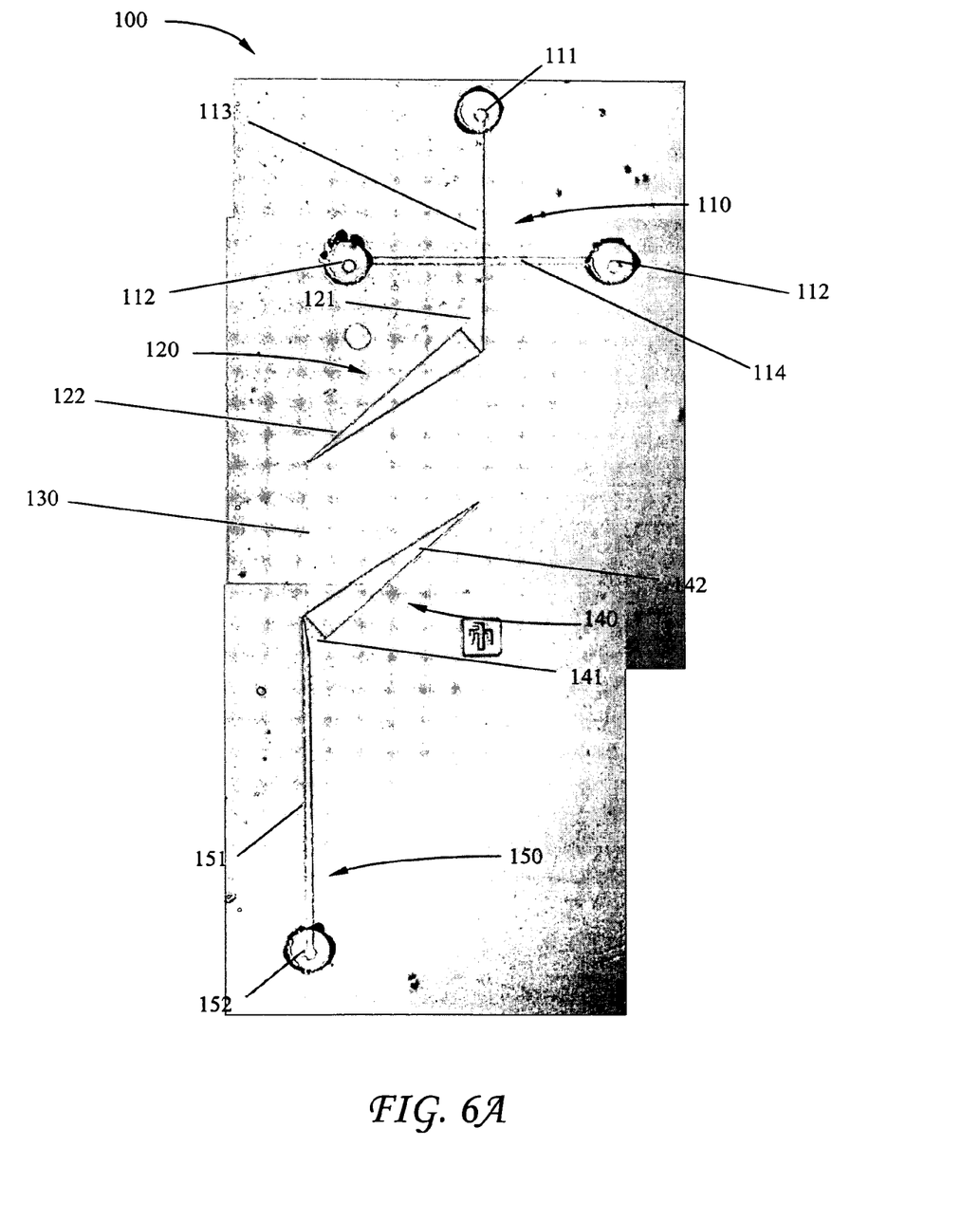
FIG. 6A shows a photomicrograph of an actual micro-mixer constructed as described by herein below.

For example, consider the etched channel features shown in FIG. 6A. Here three microscope images are compiled to obtain a panoramic view of micro-mixer 100 which is comprised of an injector section 110 at the top of the image that delivers fluid into expansion section 120 and thence into to a wide, shallow central channel region 130 where diffusive mixing can proceed. Central channel region 130 is followed again by a constriction section 140 (the inverse of expansion region 120) and outlet section 150.

Injector section 110 is itself comprised of inlet ports 111 and 112 for introducing Fluids A and B into intersecting channel lengths 113 and 114. Respective expansion/contraction sections 120 and 140, disposed at either end of shallow, central channel region 130, are made up of shallow-faceted prism channel portions 121 and 141, respectively, and deep-faceted prism channel portions 122 and 142, respectively. Expansion section 120 re-directs injected Fluids A and B into a shallow, central channel region 130, in such a way as to minimize or eliminate dispersion in the moving fluids, where diffusive mixing is advantaged due to the relative depth of this region 130. Finally, the mixed fluid is channeled away from the central channel region 130, through contraction section 140 and into outlet section 150 comprised of channel length 151 and outlet port 152 which delivers the mixed fluids for further processing or disposal.

Figure 6B:
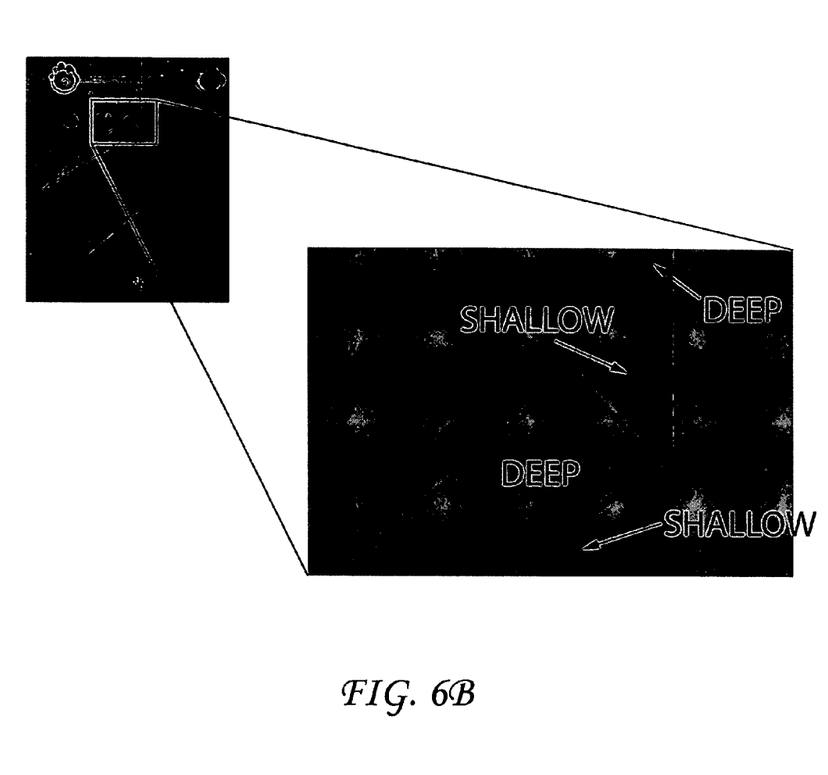
FIG. 6B shows a close-up view of the expansion channel section of the actual micro-mixer constructed as described by herein below.

The length of the wide, shallow region can be chosen to have any desired value, limited only by the size of the device substrate employed. After the wide region, the channel can be contracted back to a narrow section, which is desirable in many instances as, for example, when detection using laser-induced fluorescence in a narrow region is of benefit. The respective position of deep and shallow regions is illustrated further in the magnified image of FIG. 6B. Here, the angles between deep and shallow regions correspond to an 85° incidence angle for a 10:1 permeability ratio for a 3-interface, 30× expander without skew compensation, as described in U.S. Patent Application Serial Number 20030230489, herein incorporated by reference.

Those skilled in the art will recognize that the use of faceted prismatic sections is provided only as an example: the concept presented herein will function properly for any approach that expands the mixer channel. However, methods that retain substantially uniform fields while minimizing dispersion are highly advantageous.

What is claimed is:

1. A fluid micromixer, comprising:
a cover portion disposed on a base portion,
wherein said cover portion comprises top and bottom surfaces, a first flow channel disposed in said cover portion bottom surface along a first flow axis, said first flow channel having a uniform width and terminating at first and second ends, said cover portion further comprising a first fluid inlet means disposed along said first flow axis spaced away from said first end and extending through said cover portion, a second flow channel disposed in said cover portion bottom surface along a second flow axis about perpendicular to said first flow axis, said second flow channel having a uniform width and terminating at second and third fluid inlet means extending through said cover portion, said second flow channel crossing and communicating with said first end, and a fluid outlet means extending through said cover portion and intersecting said second end; and
said base portion comprising top and bottom surfaces and a third flow channel disposed in said base portion top surface along a third flow axis and terminating at third and fourth ends, said third flow channel having a uniform width substantially equal to said first flow channel width, wherein said first and third flow axes are substantially coplanar, wherein said second and fourth ends coincide, and wherein said first fluid inlet means intersects said third end.

2. The fluid micromixer of claim 1, wherein each of said first, second, and third fluid inlet means and said fluid outlet means comprise a portal at said cover portion top surface and a connecting fluid conduit passing through some or all of a thickness of said cover portion.

3. The fluid micromixer of claim 2, wherein each of said fluid inlet and said fluid outlet portals further comprise a separate fluid reservoir surrounding and communicating with each of said portals.

4. The fluid micromixer of claim 1, wherein said third flow channel crosses and opens into said second flow channel at said first flow channel first end.

5. The fluid micromixer of claim 2, wherein each of said fluid conduits comprise a vertical flow channel.

6. The fluid micromixer of claim 1, wherein said first and second flow channels are either curved or straight.

7. The fluid micromixer of claim 1, wherein said first and second flow channels are comprised of curved and straight portions.

8. The fluid micromixer of claim 1, wherein fluid flow is driven by electrokinetic pumping, by pressure pumping, by gravity, or by magnetic fields.

9. The fluid micromixer of claim 8, wherein convection in said fluid flow is chosen with respect to diffusion.

10. The fluid micromixer of claim 8, wherein said fluid flow is laminar.

11. The fluid micromixer of claim 1, wherein said first fluid channel includes 2 or more regions of differing conductance.

12. The fluid micromixer of claim 11, wherein said of differing conductance comprises regions of different widths and depths.

13. The fluid micromixer of claim 12, wherein said regions of different widths and depths are arranged to change the flow direction of said fluid.

* * * * *